Feb. 28, 1928.

J. A. LEEPER

METHOD OF WELDING

Filed Aug. 31, 1925

1,660,491

INVENTOR
JAMES A. LEEPER
BY *Wm. W. Cady*
ATTORNEY

Patented Feb. 28, 1928.

1,660,491

UNITED STATES PATENT OFFICE.

JAMES A. LEEPER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

METHOD OF WELDING.

Application filed August 31, 1925. Serial No. 53,457.

This invention relates to welded joints, and more particularly to an electrically welded joint and the process of making same.

The principal object of my invention is to provide an improved electrically welded joint.

In electrically welded joints for plates, reservoirs, and the like, it has been the recommended practice to scarf the ends of the plates, so that a double V space is formed between the ends when brought together for welding. The weld is first made on one side of the plates by feeding a metal electrode to the joint, the metal from the electrode filling the V at one side and fusing with the metal of the plates. The plates are then welded in a similar manner on the opposite sides of the plates by a separate welding operation.

According to my invention, the welding is effected by one welding operation conducted at one side of the plates to be welded, so that time and labor are saved in the welding operation and a more perfect joint is secured for reasons which will be hereinafter more fully explained.

Figure 1:
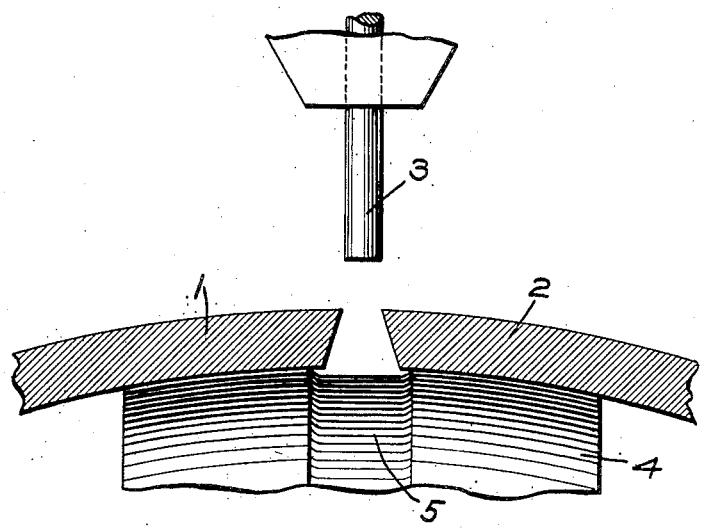
Figure 2:
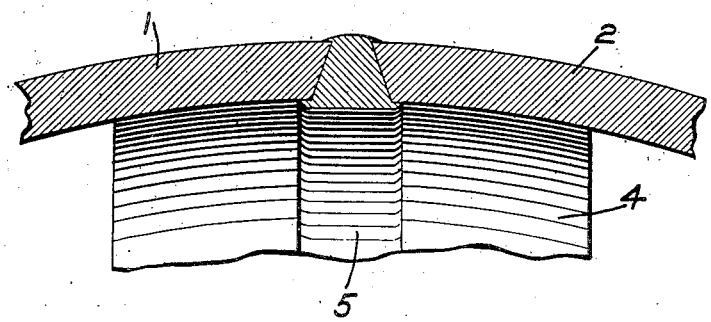

In the accompanying drawing, Fig. 1 is a view of a joint about to be electrically welded in accordance with my invention; and Fig. 2 a view of the finished joint.

In Fig. 1 is shown ends 1 and 2 of a reservoir, brought together in position for welding. The ends are scarfed as shown, so that the space between the plates at the inner face is greater than the space between the plates at the outer face, and preferably the space at the inner face is substantially equal to the thickness of the plates to be welded. A metal electrode 3 is positioned above the joint and the usual means (not shown) are provided for feeding the electrode to the joint.

Disposed in engagement with the inner surface of the plates 1 and 2 are one or more metal chill rolls 4, preferably of copper, and each roll is provided with a groove or recess 5, such as to form a space below the joint of greater width than the width of the space between the edges of the plates at the inner face.

In the welding operation, when a suitable fusing current is supplied to the electrode 3 and the electrode is fed to the joint, the usual welding arc is formed and metal from the electrode is fused and is supplied to fill the space between the ends of the plates, the space between the plates at the inner face being wider than the space at the outer face, ample provision is made to permit the free flow of metal to fill the recess 5 in the chill roll 4. The roll being spaced by recess 5 from the joint space prevents chilling of the metal in the joint and consequently assures a more perfect weld.

It will now be evident that with my invention, the welding of plates is effected by a single welding operation and at the same time a solid, homogeneous weld is obtained.

Having now described my invention, what I claim as new and desire to secure by Letters Patent, is:—

1. The process of forming a weld between plates which consists in beveling the ends of the plates, in positioning the plates with the beveled ends spaced apart to form an inwardly diverging space, positioning a member having a recess at the inner side of said plates with the recess spanning said space, and in then applying a metal electrode so as to supply metal fused from said electrode solely to the space between the ends of the plates.

2. The process of forming a weld between plates which consists in scarfing the ends of said plates, positioning the plates with the scarfed ends spaced apart to form an inwardly diverging space, positioning a member having a recess at one side of the plates so that said recess spans the greater inner width of said space, and in supplying metal fused from an electrode to said space at the opposite side of the plates.

3. The process of forming a weld between plates which consists in scarfing the ends of said plates, positioning the plates with the scarfed ends spaced apart to form an inwardly diverging space, positioning a member having a recess at one side of the plates so that said recess spans the greater inner width of said space, said recess being of such extent as to overlap the inner width of said space, and in then applying a metal electrode to said space at the opposite side of the plates to thereby supply metal fused from said electrode to said space.

In testimony whereof I have hereunto set my hand.

JAMES A. LEEPER.